United States Patent
Madhur et al.

(10) Patent No.: US 6,823,449 B2
(45) Date of Patent: Nov. 23, 2004

(54) DIRECTORY STRUCTURE-BASED READING OF CONFIGURATION ROM

(75) Inventors: Srinivas Madhur, Westford, MA (US); Mark R. Johnson, Nashua, NH (US); Stephen A. Jay, Woburn, MA (US); Diana C. Klashman, Milford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 618 days.

(21) Appl. No.: 09/803,531

(22) Filed: Mar. 9, 2001

(65) Prior Publication Data

US 2002/0129231 A1 Sep. 12, 2002

(51) Int. Cl.$^7$ .................................................. G06F 9/24
(52) U.S. Cl. ......................................... 713/1; 707/205
(58) Field of Search ............................... 713/1; 710/10; 707/205

(56) References Cited

U.S. PATENT DOCUMENTS

| 5,787,445 A | * | 7/1998 | Daberko | 707/205 |
| 5,809,331 A | * | 9/1998 | Staats et al. | 710/10 |

* cited by examiner

*Primary Examiner*—Thomas Lee
*Assistant Examiner*—P. Chandrasekhar
(74) *Attorney, Agent, or Firm*—Meyertons Hood Kivlin Kowert & Goetzel, P.C.; B. Noël Kivlin

(57) ABSTRACT

A method of reading configuration ROM in a serial bus device reads only portions of the ROM that are organized in a directory structure. Typically, the configuration ROM follows the IEEE 1212 and/or 1394 standards and uses an IEEE 1394 bus. Based on the information read from the configuration ROM, a connecting computer can determine the appropriate device driver to use for communications with the device.

28 Claims, 3 Drawing Sheets

DIRECTORY STRUCTURE-BASED READING OF CONFIGURATION ROM

FIELD OF THE INVENTION

The invention generally relates to configuring a device connected to a computer, and more particularly, to a technique for reading the configuration read-only memory in a serial bus device.

GLOSSARY

In this description and the accompanying claims, the following terms have meanings as indicated, unless the context otherwise requires: ROM read-only memory quadlet four consecutive bytes

BACKGROUND ART

It is common for personal computers to connect to other devices over a serial connection bus. A computer communicates with a serial bus device using a device driver program. Some serial buses such as IEEE 1212 compliant buses use devices with a configuration ROM on them. When a new device is connected, the computer uses the serial bus to read configuration ROM in the new device. This information is needed, for example, to determine what driver to use with the new device. This may occur, for example, after a reset signal is sent. Further details of device identification following a reset signal are provided in applicants' copending application entitled "Method And Program Code For Identifying New Nodes On A Bus Following A Reset," having the same assignee and filing date, and which is hereby incorporated herein by reference.

IEEE 1212 defines configuration ROM that can be used by serial bus devices, and IEEE 1394-1995, also known as Firewire, further refines it. The contents of IEEE 1212 and 1394-1995 are hereby incorporated herein by reference. In IEEE 1394-1995 compliant devices, the configuration ROM is 1024 bytes in size, which can be read only 4 bytes (called a quadlet) at a time. Thus, straightforwardly reading the entire configuration ROM of a newly attached device requires 256 bus transactions.

SUMMARY OF THE INVENTION

Embodiments of the present invention are based on reading configuration ROM having a directory tree structure such as defined by IEEE 1212, by following the directory tree structure. This approach reduces the number of bus transactions needed to read all of the configuration ROM, thereby increasing the speed and efficiency of the system. In one specific embodiment, the configuration ROM follows the IEEE 1212 and/or 1394 standards, using an IEEE 1394 bus. This information may then be used, for example, to bind a corresponding device driver to the serial bus device.

One embodiment is based on maintaining a directory stack. Initially, the root directory of the configuration ROM is set as a current directory. The second step reads all the quadlets in the current directory. The third step scans the current directory for indirect entries, and if one is found, the current position of the scan is pushed onto the directory stack and the indirect entry is made the current directory; steps 2 and 3 are then repeated. Once no indirect entries are found in step 3, step 4 checks the directory stack, and if it is not empty, the top item is popped off, and the algorithm returns to step 3 at the scan position associated with the popped off item.

BRIEF DESCRIPTION OF THE DRAWINGS

The present invention will be more readily understood by reference to the following detailed description taken with the accompanying drawings, in which.

DETAILED DESCRIPTION OF SPECIFIC EMBODIMENTS

Previously, when binding a serial device to a driver, every bit in the device configuration ROM was read. This assumes that every bit of the configuration ROM represents data that is needed. Actually though, some portions of the configuration ROM may not be used at all. Thus, representative embodiments of the present invention read only those portions of the configuration ROM containing data that is needed to bind a serial bus device to a driver. Empty and unnecessary portions of the configuration ROM are not read.

Figure 1:
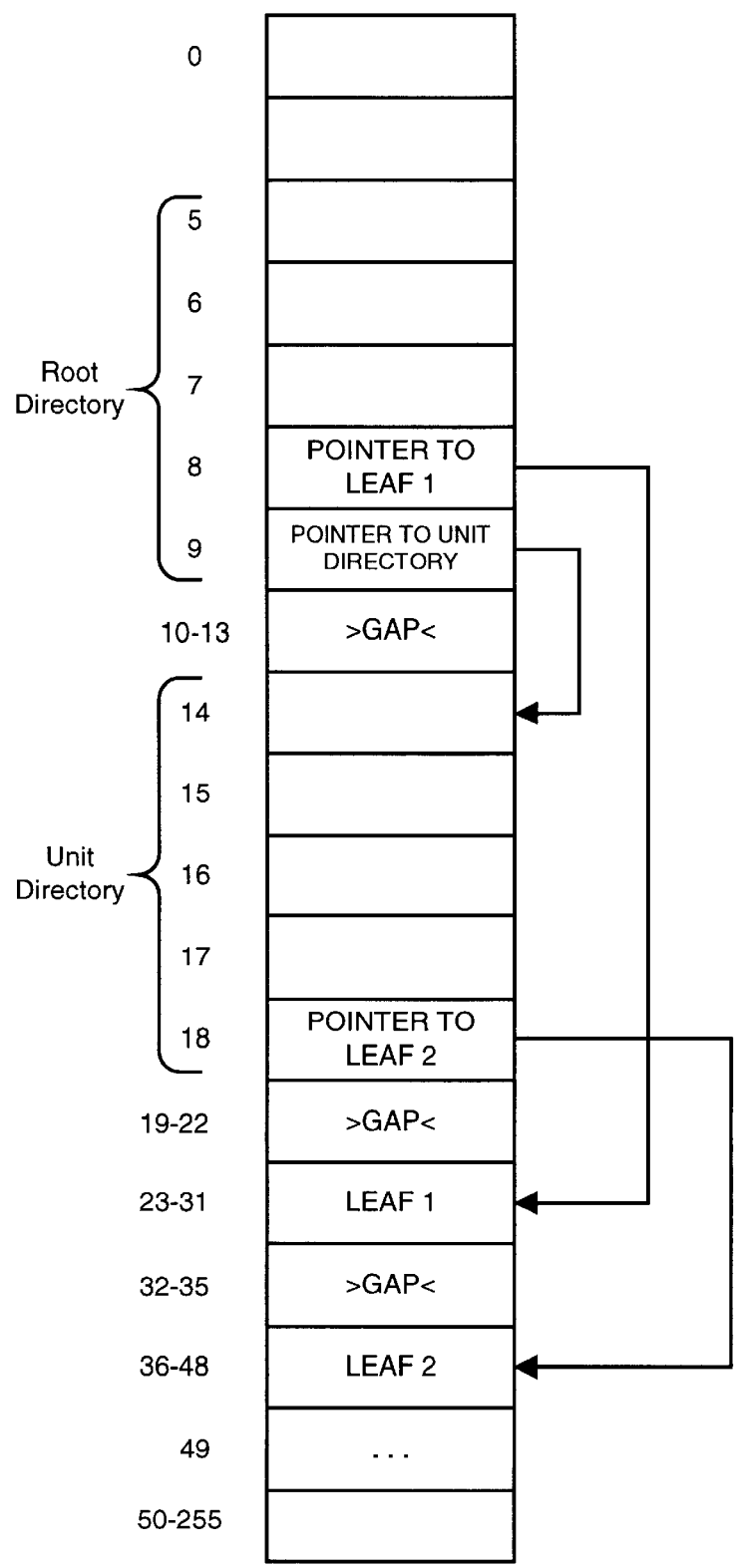
FIG. 1 shows the logical structure of a typical configuration ROM for an IEEE 1394-1995 serial port device.

FIG. 1 shows the logical structure of a typical configuration ROM for a serial port device. The ROM is 1024 bytes in size, organized in 4-byte sequential quadlets as specified by IEEE standard 1212. Along the left edge of the ROM shown in FIG. 1 are the quadlet numbers 0–255. In FIG. 1, the root directory starts at quadlet 5 and continues through quadlet 9 (quadlets 0–4 contain information that is not part of the ROM directory tree organization). Quadlets 5–7 contain information in the root directory. Quadlet 8 contains a pointer to Leaf 1, which can be considered an "indirect entry" of Leaf 1 in the root directory. Similarly, quadlet 9 contains a pointer that makes an indirect entry for a unit directory that spans quadlets 14–18. Quadlet 18 of the unit directory also contains an indirect entry pointer to Leaf 2. Leaf 1 includes quadlets 23–31, and Leaf 2 includes quadlets 36–48. The ROM structure depicted in FIG. 1 includes unused blocks of quadlets: 10–13, 19–22, and 32–35.

Representative embodiments of the present invention read the information in the directory tree structure of the configuration ROM by following the tree structure. This ordered reading skips quadlet gaps such as those illustrated in FIG. 1 from 10–13, 19–22, and 32–35. This reduces the time and the number of bus transactions needed to read the configuration ROM.

Figure 2:
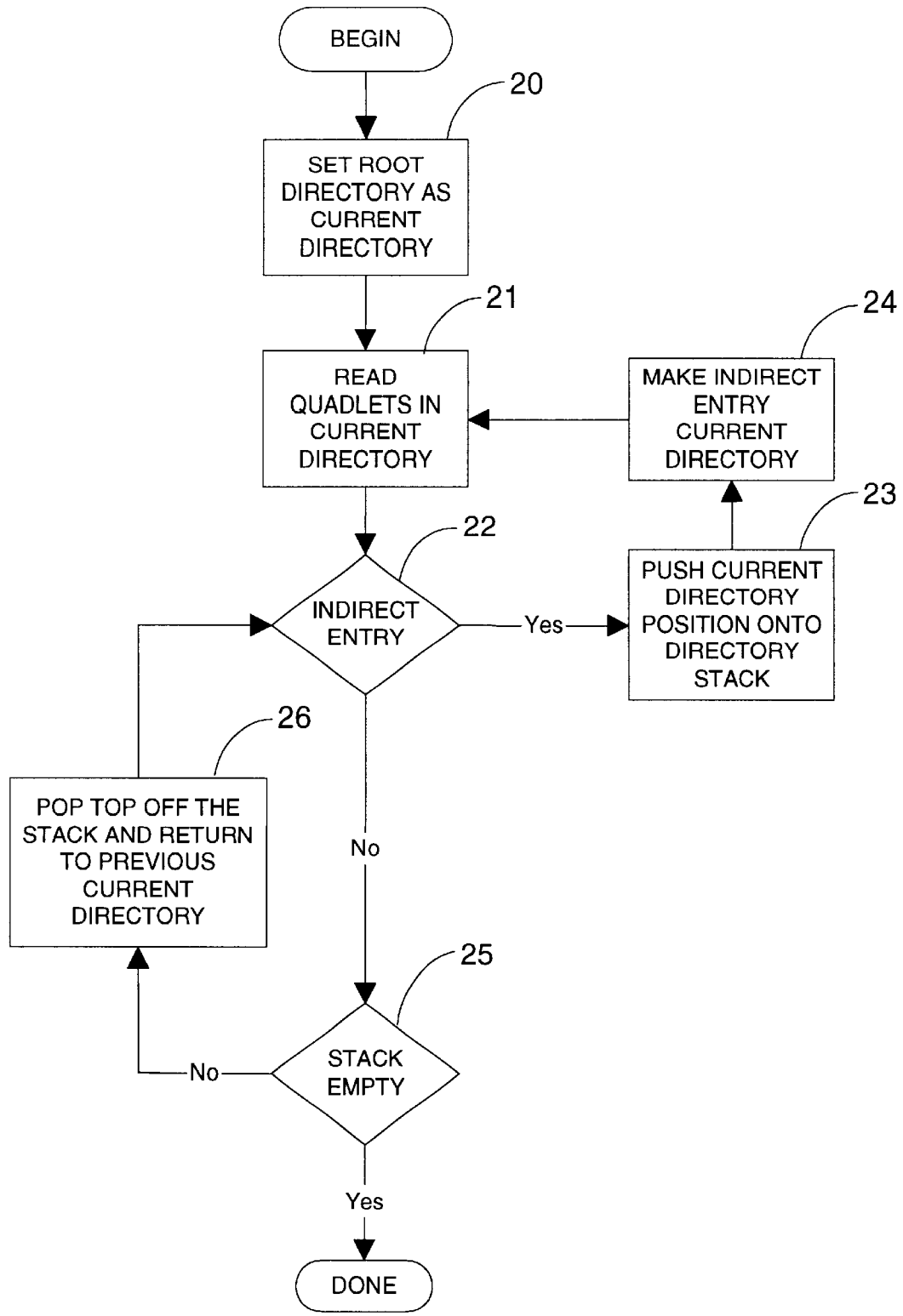
FIG. 2 shows the logical sequence in reading a configuration ROM according to one embodiment of the present invention.

FIG. 2 shows the logical sequence in reading a configuration ROM according to one embodiment of the present invention. At first, in step 20, the root directory is set as the current directory. Then, the quadlets in the current directory are all read, step 21. Then, step 22 checks if any quadlet in the current directory is an indirect entry pointer. If so, the current directory position is pushed onto the directory stack, step 23. The indirect entry then is made the current directory, step 24, and steps 21 and 22 are repeated. If, in step 22, there are no indirect entry pointers, then the directory stack is checked to see if it is empty, step 25. If the directory stack is not empty, then the top item is popped off the stack, which returns the algorithm to the previous position in the previous current directory, and steps 22-25 are repeated. If, in step 25, the directory stack is empty, then the algorithm is done, all of the directory tree structure of the configuration ROM has been read.

Figure 3:
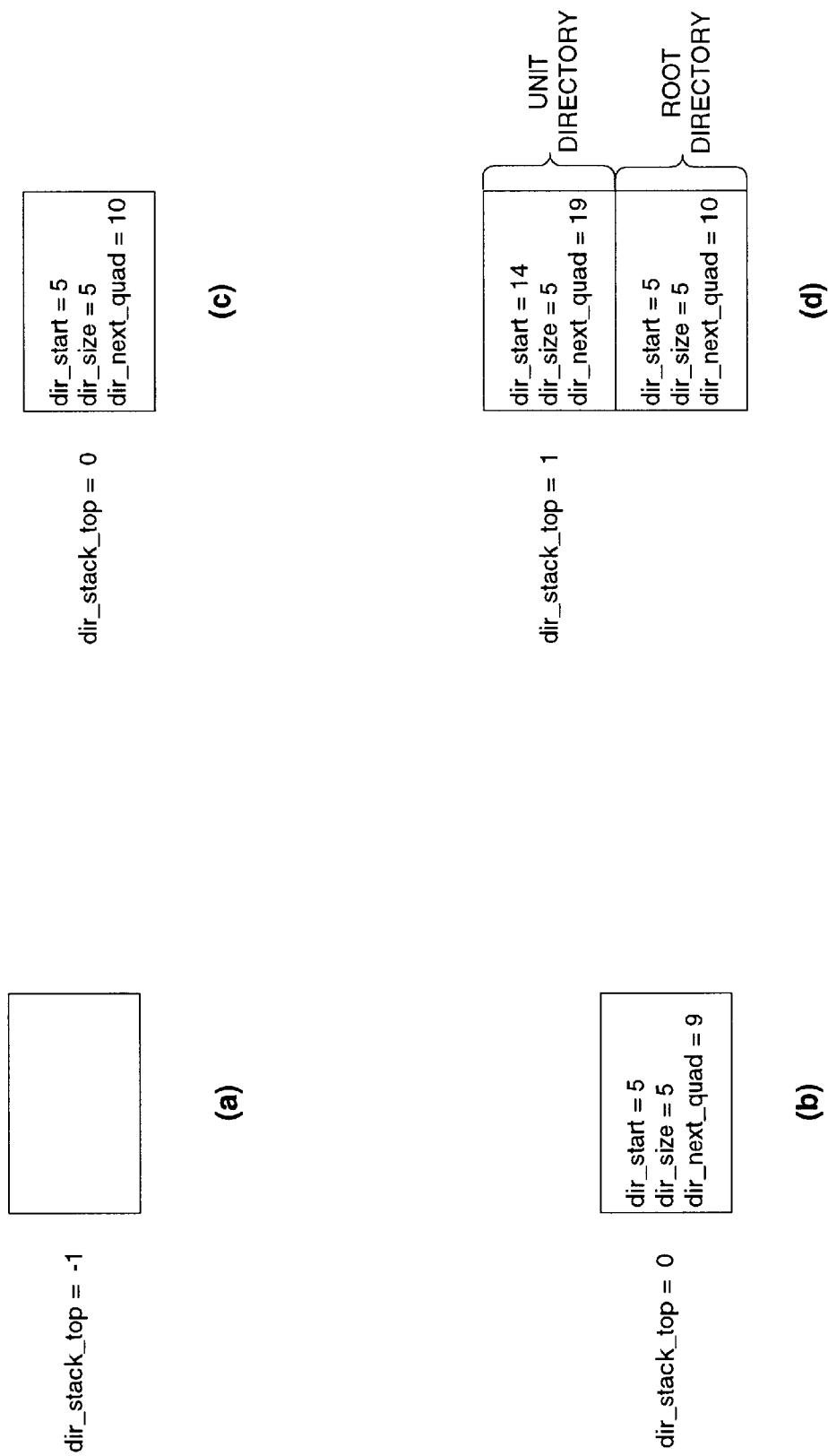
FIG. 3 shows the state of a configuration stack at various times when reading a configuration ROM according to a typical embodiment.

FIG. 3 shows the state of a configuration stack at various times when reading a configuration ROM such as shown in FIG. 1 according to the logical sequence of FIG. 2. When the root directory is first set as the current directory in step 20, the directory stack is empty as shown in FIG. 3(*a*). Then, quadlets 5–9 are read, step 21. In step 22, the root directory is checked for any indirect entry pointers. At quadlet 8, is an indirect entry pointer to quadlet 23 and Leaf 1. Thus, the current directory position is pushed onto the directory stack, step 23 and FIG. 3(*b*). The position may be indicated as shown in FIG. 3(*b*) by the next quadlet indicator, which in this case points to quadlet 9. Then, step 24 makes Leaf 1 the current directory, and step 21 reads quadlets 23–31 of Leaf 1. Leaf 1 has no indirect entry pointers, so step 22 takes the "no" exit to step 25. Step 25 checks the directory stack to see if it is empty. Since the stack is as shown in FIG. 3(*b*), it is not empty. Therefore, step 26 pops the top off the directory stack, and the algorithm returns to the next position in the next higher directory, in this case, the root directory.

At this point, step 22 continues from its previous position in the root directory looking for any more indirect entry pointers. At quadlet 9 is an indirect entry pointer to quadlet 14 and the unit directory. Thus, step 22 gives a "yes" exit to step 23. Step 23 pushes the current directory position onto the directory stack as shown in FIG. 3(*c*). Step 24 makes the unit directory the current directory. Then, step 21 reads quadlets 14–18 of the unit directory. Next, step 22 checks the unit directory for any indirect entry pointers. Quadlet 18 contains an indirect entry pointer to quadlet 36 and Leaf 2. Therefore, step 23 pushes the current directory position onto the directory stack as shown in FIG. 3(*d*), and step 24 makes Leaf 2 the current directory. Step 21 then reads quadlets 36–48 of Leaf 2. Step 22 finds no indirect entry pointers in Leaf 2, and step 25 checks to see if the directory stack is empty, which it is not, see FIG. 3(*d*). Thus, step 26 pops the top off the stack, and the algorithm returns to the next position in the next higher directory, in this case, the unit directory. At this point, the directory stack is once again as shown in FIG. 3 (*c*).

Step 22 continues from its previous position in the unit directory but finds no more indirect entry pointers, giving a "no" exit to step 25. The directory stack is not empty (see FIG. 3(*c*)), so step 26 pops the top off the stack, and the algorithm returns to the next position in the next higher directory for step 22. This empties the directory stack, shown in FIG. 3(*a*). Now, the root directory has no more indirect entry pointers, so step 22 exits to step 25. Step 25 finds the directory stack empty, and the algorithm is complete. All of the valid configuration ROM contents have been read, while the quadlet gaps from 10–13, 19–22, and 32–35 were skipped.

Any device on a serial bus may perform this method to identify a new device on the bus. In one specific embodiment, the bus may be an IEEE 1394 (Firewire) bus. Upon completing the retrieval of the directory tree from the previously unknown new device, a device driver can be selected on the basis of the retrieved information. The device binds the known new device to a device driver according to the information obtained from the configuration ROM. The device driver was selected given only the information in the configuration ROM linked to the root directory through the tree structure.

Embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method of reading configuration read-only memory (ROM) in a serial bus device, the method comprising:
   reading only portions of a configuration ROM that are organized in a directory structure and
   maintaining a directory stack;
   wherein said reading only portions of the configuration ROM and maintaining the directory stack comprises:
   (i) setting a root directory in the configuration ROM as a current directory;
   (ii) reading the current directory;
   (iii) scanning the current directory for indirect entries, and if an indirect entry is found:
      (a) pushing the current position of the scan onto the directory stack,
      (b) making the indirect entry the current directory, and
      (c) repeating steps (ii) and (iii).

2. A method according to claim 1, wherein the configuration ROM follows a recognized standard for computer bus architecture.

3. A method according to claim 2, wherein the recognized standard is the IEEE 1212 standard.

4. A method according to claim 2, wherein the recognized standard is the IEEE 1394 standard.

5. A method according to claim 4, wherein the reading uses an IEEE 1394 bus.

6. A method according to claim 1, wherein, if an indirect entry is not found and the directory stack is not empty, said reading only portions of the configuration ROM and maintaining the directory stack further comprises:
   (a) popping the top item off the directory stack, and
   (b) returning to step (iii) at the scan position associated with the popped off item.

7. A method according to claim 1, further including binding a corresponding device driver to the serial bus device.

8. A computer program product for use on a computer system for reading configuration read-only memory (ROM) in a serial bus device, the computer program product comprising a computer usable medium having computer readable program code thereon, the computer readable program code comprising:
   program code for reading only portions of a configuration ROM that are organized in a directory structures;
   wherein the program code for reading only portions of the configuration ROM includes program code for maintaining a directory stack;
   wherein the program code for reading only portions of the configuration ROM and for maintaining the directory stack comprises:
      (i) program code for setting a root directory in the configuration ROM as a current directory;
      (ii) program code for reading the current directory;
      (iii) program code for scanning the current directory for indirect entries, and if an indirect entry is found:
         (a) pushing the current position of the scan onto the directory stack,
         (b) making the indirect entry the current directory, and
         (c) repeating steps (ii) and (iii).

9. A computer program product according to claim 8, wherein the configuration ROM follows a recognized standard for computer bus architecture.

10. A computer program product according to claim 9, wherein the recognized standard is the IEEE 1212 standard.

11. A computer program product according to claim 9, wherein the recognized standard is the IEEE 1394 standard.

12. A computer program product according to claim 11, wherein the program code for reading uses an IEEE 1394 bus.

13. A computer program product according to claim 8, wherein, if an indirect entry is not found and the directory stack is not empty, the program code for reading only portions of the configuration ROM and for maintaining the directory stack further comprises program code for:
   (a) popping the top item off the directory stack, and
   (b) returning to step (iii) at the scan position associated with the popped off item.

14. A computer program product according to claim 8, further including program code for binding a corresponding device driver to the serial bus device.

15. A method of binding a device driver to an unknown serial bus device, the method comprising:
   reading over a bus, a root directory of a configuration ROM in the unknown serial bus devices;
   following a directory tree structure linked to the root directory to read over the bus portions of the configuration ROM;
   maintaining a directory stack; and
   selecting a device driver to bind to the serial bus device based on the read portions of the configuration ROM;
   wherein said following the directory tree structure linked to the root directory to read over the bus portions of the configuration ROM and said maintaining the directory stack comprises:
      (i) setting the root directory in the configuration ROM as a current directory;
      (ii) reading the current directory;
      (iii) scanning the current directory for indirect entries, and if an indirect entry is found:
         (a) pushing the current position of the scan onto the directory stack,
         (b) making the indirect entry the current directory, and
         (c) repeating steps (ii) and (iii).

16. A method according to claim 15, wherein the configuration ROM follows a recognized standard for computer bus architecture.

17. A method according to claim 16, wherein the recognized standard is the IEEE 1212 standard.

18. A method according to claim 16, wherein the recognized standard is the IEEE 1394 standard.

19. A method according to claim 18, wherein the reading uses an IEEE 1394 bus.

20. A method according to claim 15, wherein, if an indirect entry is not found and the directory stack is not empty, said following the directory tree structure linked to the root directory to read over the bus portions of the configuration ROM and maintaining the directory stack further:
   (a) popping the top item off the directory stack, and
   (b) returning to step (iii) at the scan position associated with the popped off item.

21. A computer program product for use on a computer system for binding a device driver to an unknown serial bus device, the computer program product comprising a computer usable medium having computer readable program code thereon, the computer readable program code comprising:
   program code for reading over a bus, a root directory of a configuration ROM in the unknown serial bus device;
   following a directory tree structure linked to the root directory to read over the bus portions of the configuration ROM; and
   selecting a device driver to bind to the serial bus device based on the read portions of the configuration ROM;
   wherein the program code for reading over the bus includes program code for maintaining a directory stack;
   wherein the program code for reading over the bus and for maintaining the directory stack comprises:
      (i) program code for setting the root directory in the configuration ROM as a current directory;
      (ii) program code for reading the current directory;
      (iii) program code for scanning the current directory for indirect entries, and if an indirect entry is found:
         (a) pushing the current position of the scan onto the directory stack,
         (b) making the indirect entry the current directory, and
         (c) repeating steps (ii) and (iii).

22. A computer program product according to claim 21, wherein the configuration ROM follows a recognized standard for computer bus architecture.

23. A computer program product according to claim 22, wherein the recognized standard is the IEEE 1212 standard.

24. A computer program product according to claim 22, wherein the recognized standard is the IEEE 1394 standard.

25. A computer program product according to claim 24, wherein the program code for reading uses an IEEE 1394 bus.

26. A computer program product according to claim 21, wherein, if an indirect entry is not found and the directory stack is not empty, the program code for reading over the bus and for maintaining the directory stack further comprises program code for:
   (a) popping the top item off the directory stack, and
   (b) returning to step (iii) at the scan position associated with the popped off item.

27. A system, comprising:
   a device coupled to a serial bus and including a configuration ROM;
   a device driver unit coupled to the device via the serial bus and configured to bind a device driver to the device by reading only portions of the configuration ROM that are organized in a directory structure and by maintaining a directory stack;
   wherein said reading only portions of the configuration ROM and said maintaining the directory stack comprises:
      (i) setting a root directory in the configuration ROM as a current directory;
      (ii) reading the current directory;
      (iii) scanning the current directory for indirect entries, and if an indirect entry is found:
         (a) pushing the current position of the scan onto the directory stack,
         (b) making the indirect entry the current directory, and
         (c) repeating steps (ii) and (iii).

28. The system of claim 27, wherein, if an indirect entry is not found and the directory stack is not empty, said reading only portions of the configuration ROM and said maintaining the directory stack further comprises:
   (a) popping the top item off the directory stack, and
   (b) returning to step (iii) at the scan position associated with the popped off item.

* * * * *